United States Patent Office 3,220,443
Patented Nov. 30, 1965

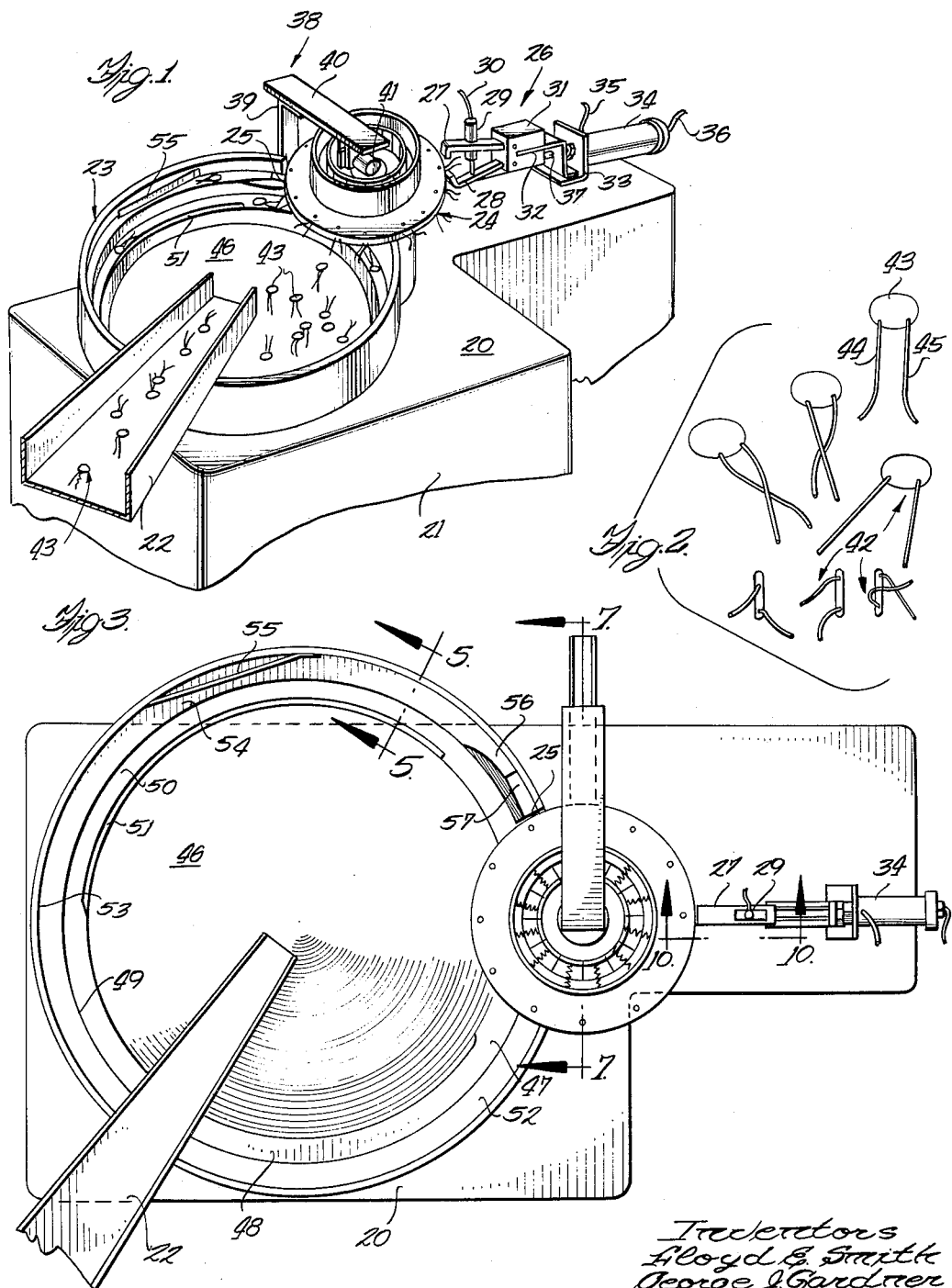

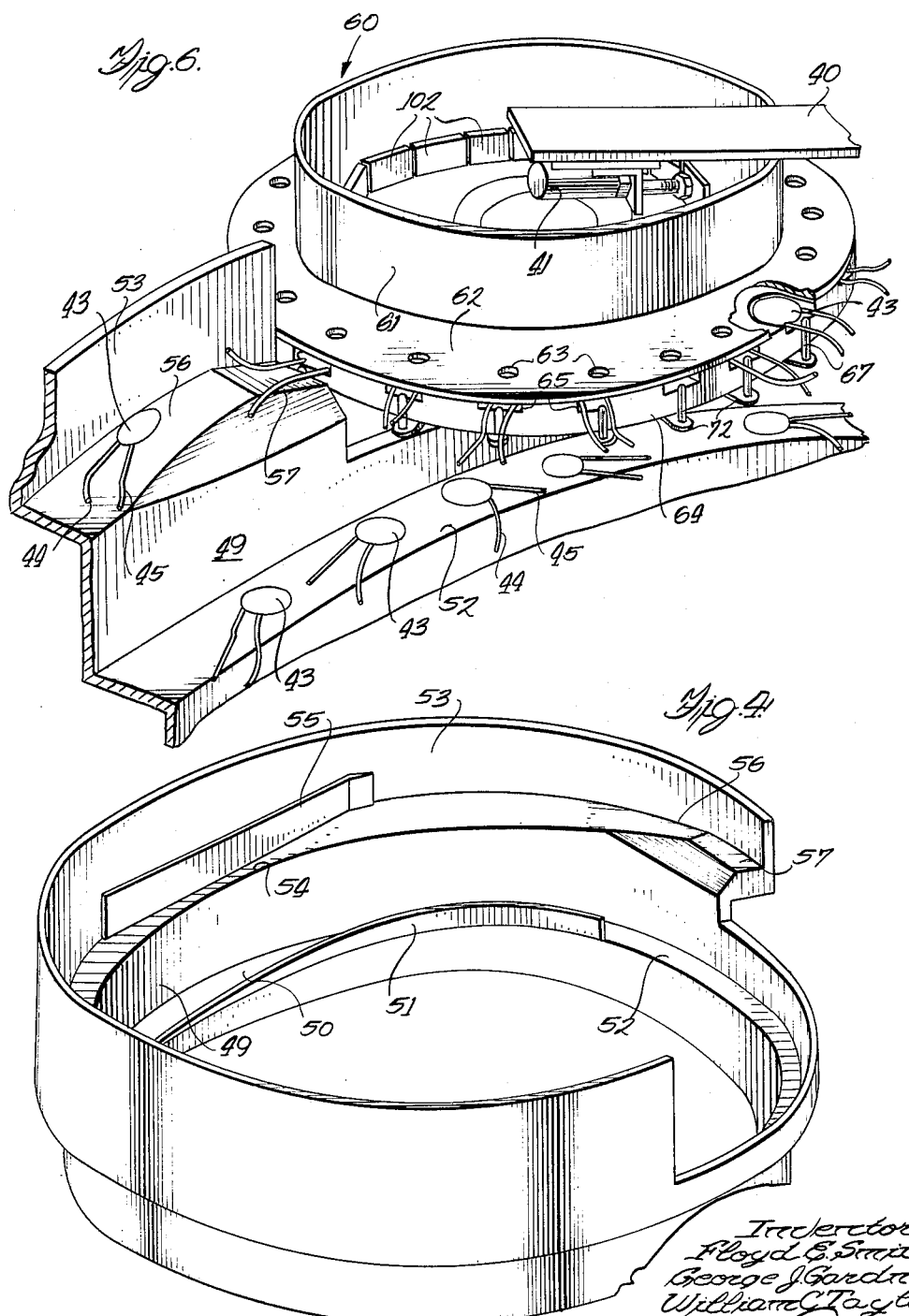

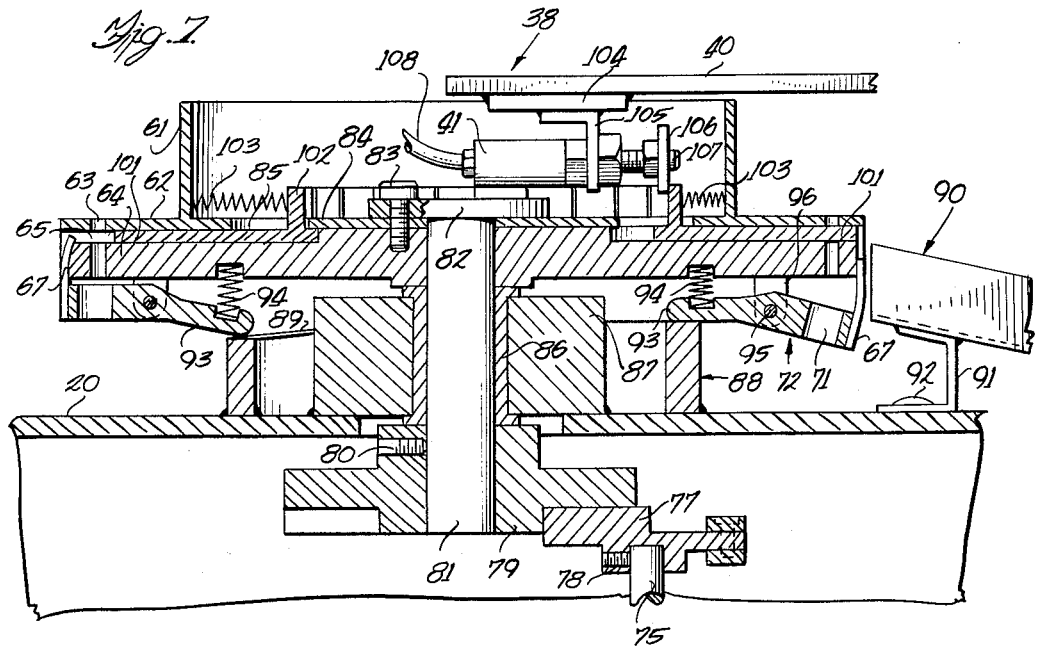

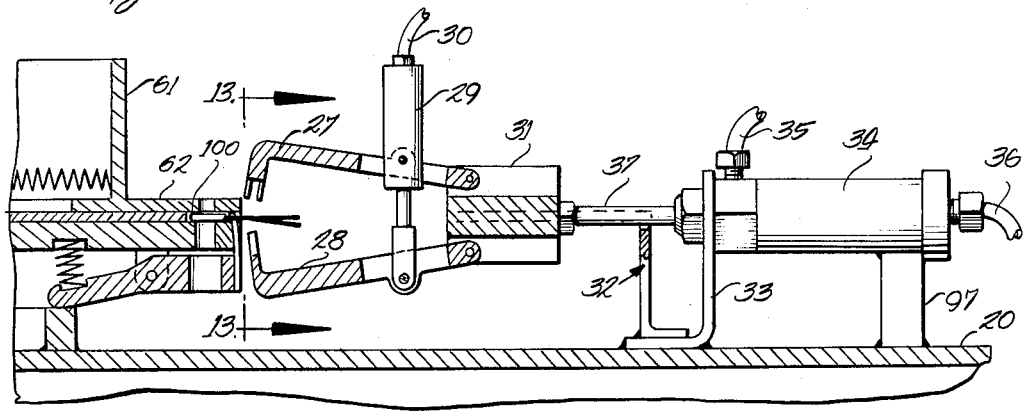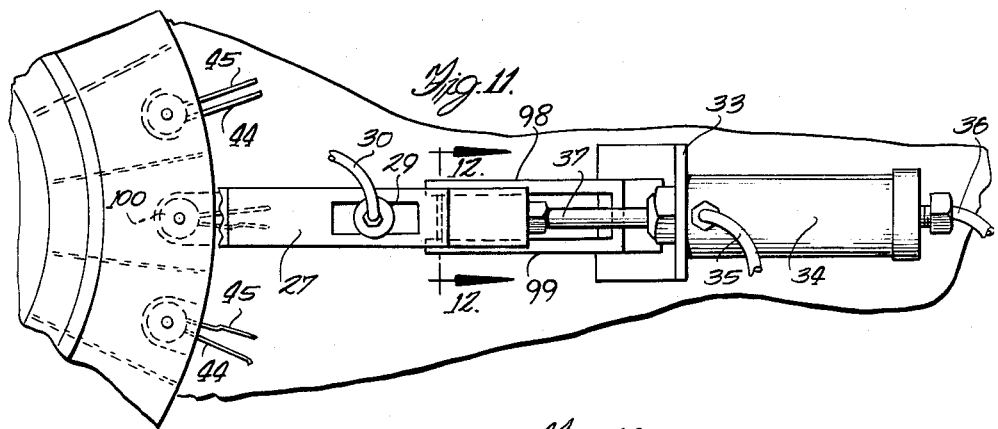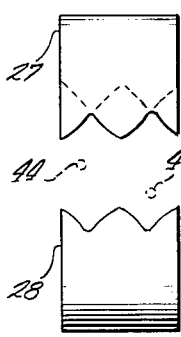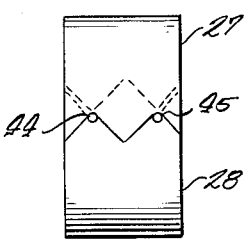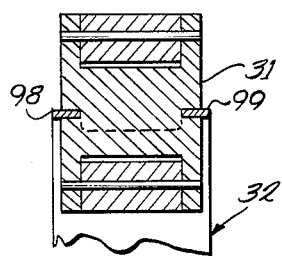

3,220,443
MATERIAL HANDLING SYSTEM
Floyd E. Smith, Erie, William C. Taylor, Waterford, and George J. Gardner, Fairview, Pa., assignors to Automation Devices, Inc.
Filed Oct. 24, 1962, Ser. No. 232,809
8 Claims. (Cl. 140—147)

The present invention relates generally to equipment for the automatic handling of relatively small parts. In particular, the invention is directed to means for both providing a desired alignment of such parts and a predetermined configuration of each part, even though the parts are received in deformed or undesired configuration and in a multiplicity of different alignments. More particularly, the handling of very light parts with tangled wire leads is contemplated so that such parts can be positively oriented to straighten the leads. Such parts, in a sense, are like a tadpole, but differ in having two or more tails which become inanimately permanently tangled.

The advance of automation, or the technique of doing automatically by machine what has heretofore been done by manual labor and thus significantly reducing the cost of a given operation, has been applied to many phases of the electronic production and assembly industries. One component that is now widely produced by machine is the small ceramic capacitor, the body of which is disk-shaped and approximately the size of a ten-cent piece. This small disk comprises both the capacitor plates and the dielectric material, and two leads extend from the capacitor body outwardly for connection in a circuit. After the capacitor body has been formed, certain operations are performed automatically, such as the dipping of the capacitor body into a solution for affixing a humidity-resistant coating to the outer portion of the capacitor body. Even after the capacitor has been completely formed, automated handling is frequently utilized in the production of electronic assemblies and sub-assemblies, especially where printed circuit boards and related modular components are used. For optimum efficiency and highest production, it is requisite that the two leads extend from the head portion or the body of the capacitor in a uniform configuration substantially straight and parallel with each other. Unfortunately in the manufacturing and subsequent handling operations, many times the leads become crossed and tangled and otherwise disposed in various configurations other than the optimum configuration for automated handling. Sometimes the undesired forms are imparted to the leads near the end of the manufacturing operation when the two leads are effectively formed when the bight portion of a single conductor, previously affixed to the capacitor body thoughout the preliminary part of the manufacturing operation, is severed. No matter the reason, it is manifestly requisite to provide parts of uniform alignment (e.g., head-first) and standard configuration if automated manufacturing and assembling processes are to operate with highest efficiency and reliability.

It is, therefore, a primary object of the present invention to provide a material handling system for accepting parts varying in configuration and with different alignments, and for imparting a uniform configuration to each part and thereafter discharging each part in accordance with a desired alignment.

It is a more specific object of the invention to provide such a system, especially suited for receiving disk capacitors and other lightweight parts in random volume with the leads entangled, and for effectively sorting the capacitors and straightening the leads and thereafter discharging the capacitors in a uniform manner.

A significant object of the invention is to straighten the tangled leads of disoriented parts while simultaneously positively positioning the parts for oriented ejection. In this manner, for example, the parts can be delivered into a magazine, or even directly fed to an automated assembly machine.

Further objects and advantages of the present invention will become apparent as the following description of an illustrative embodiment proceeds, taken in conjunction with the accompanying illustrative drawings in which:

FIGURE 1 is a perspective illustration of a material handling system constructed in accordance with the inventive principles;

FIGURE 2 is an illustrative showing of a plurality of parts before alignment and standardization of shape;

FIGURE 3 is a plan view of the embodiment shown in FIGURE 1;

FIGURE 4 is a perspective showing, taken on an enlarged scale, of a component shown in FIGURE 1;

FIGURE 5 is a partial perspective view taken along line 5—5 in FIGURE 3;

FIGURE 6 is a perspective illustration of a portion of the feeding components shown in FIGURE 1, taken on an enlarged scale;

FIGURE 7 is a sectional view, taken along the line 7—7 of FIGURE 3, depicting drive means and ejection means utilized in a preferred embodiment of the invention;

FIGURE 8 is a partial sectional view of certain elements shown in FIGURE 7, with one of the elements displaced to another position;

FIGURE 9 is a block diagram of certain components associated with the drive system shown in FIGURE 7;

FIGURE 10 is a sectional drawing, taken along the line 10—10 in FIGURE 3, of the shaping or lead-straightening components;

FIGURE 11 is a plan view of the structure shown in FIGURE 10;

FIGURE 12 is a sectional view, taken along line 12—12 of FIGURE 11, illustrating certain relatively movable components of the lead-straightening apparatus.

FIGURE 13 is a view taken along the line 13—13 in FIGURE 10 showing certain of the lead-straightening components in a first position; and, FIGURE 14 is a view similar to FIGURE 13 showing the components displaced to a different position.

*Introduction*

By way of orientation, in FIGURE 1 a system constructed in accordance with the inventive teaching is shown mounted on a work table 20 which is supported on a base unit 21. The input feed system includes a hopper 22 and a vibratory bowl arrangement 23, with the bowl 23 including a number of sub-units or components to be described in more detail later. Together, the hopper 22 and bowl 23 cooperate to receive incoming parts aligned in random manner and distorted into a multiplicity of configurations, so that the head or the round body portions of each capacitor and the tail portions, those portions defined by the leads, do not extend along a common axis. Furthermore, the twisting and bending of the leads illustrates the irregularities of configuration in the incoming parts. By the time that such parts approach the end of the feeding track or channel within bowl 23, a preliminary alignment of the parts has been effected in a general fore-and-aft manner, with either the head or the tail of each part being nearest the next component, an indexing wheel 24. A final alignment is made as the individual parts are fed into wheel 24, with those parts in a non-desired alignment being deflected back within the area of bowl 23. It is noted that the final "alignment" is achieved even though the angular direction and the position of the part as it enters the indexing wheel are different from the ultimate angular direction and position when the part is thereafter ejected.

The individual parts enter indexing wheel 24 at an input location referenced by numeral 25, and thereafter rotation of wheel 24 in the counterclockwise direction as viewed in FIGURE 1 carries each part around the periphery of the wheel to a position adjacent the shaping or lead-straightening mechanism 26, which imparts a uniform and desired configuration to each part by straightening the leads and positioning the leads parallel with each other. Components of the straightening mechanism 26 include a pair of upper and lower jaw members 27 and 28 operated by an actuator 29 which may be an air cylinder, solenoid or other acceptable controls. For purposes of explanation, it will be considered that various of the operating components are air cylinders and accordingly line 30 represents a hose through which gas under pressure can be selectively transmitted to effect relative displacement of jaws 27 and 28. The jaws are pivotally mounted in a slide member 31, in turn disposed for linear movement within the confines of a guide unit 32. The guide unit is affixed by welding or other means to support bracket 33, and in turn fastened to the top of work table 20. Another cylinder 34 is supported from bracket 33 and receives air alternatively over lines 35 and 36 to effect transverse displacement of cylinder rod 37 and likewise of slide member 31, to which the cylinder rod is affixed.

After the leads of the capacitor have been straightened to impart a uniform configuration to each already-aligned capacitor, the movement of indexing wheel 24 carries the capacitor through approximately another 90° of movement adjacent the ejection mechanism 38. In the ejection mechanism, a vertical support arm 39 extends upwardly from the work table and supports a transverse arm 40, from which the main ejection actuator 41 depends. Like the other cylinders 29 and 34, actuator 41 can be a pneumatic or air cylinder, but as those skilled in the art will recognize, such unit can also be electrically operated or driven by other energy depending upon the availability and desired operating characteristics of the overall system. The components of the complete system will now be described in greater detail.

*Preliminary alignment of parts*

For the purposes of this explanation, the various parts are illustrated as a plurality of capacitors 42, shown in the variety of different orientations and configurations which may be expected in FIGURE 2. The body of a capacitor is referenced by numeral 43, and the leg portions by numerals 44 and 45. It is, of course, possible to feed a light body with a single tail, or with several tails, and achieve the advantages of the invention. In FIGURE 2, if the extremities of the leg portions 44 and 45 of the capacitor to which the reference numerals are applied were straightened so that they were parallel to each other, this capacitor would have the desired configuration for automatic handling. The individual aberrations such as the crossed and tangled leads are shown both in perspective and, in the lower portion of FIGURE 2, in an end view.

FIGURE 3 depicts various major components of the invention, and with FIGURES 4 and 5 serves to illustrate the preliminary feeding arrangement. After the parts are fed in random fashion and in alignment through the hopper 22, they are dropped downwardly onto the lower surface 46 of bowl 23. This bottom surface is conical, being highest in the center and lowest at the outer periphery thereof as better depicted in FIGURE 5. The bowl 23 is agitated in a vibratory manner to feed the various parts outwardly from the center of bottom surface 46 to the outer periphery, and to effect a clockwise movement of the parts as referenced to the showing of FIGURE 3. Accordingly, the individual parts are vibrated outwardly and in a clockwise direction to enter, at input location 47, upon the journey up a track or channel defined on the inner periphery of bowl 23.

The parts are displaced along the initial portion 48 of this track, with the side walls 49 preventing the movement of the parts outwardly of track 48. Any parts inadvertently dropped over the inner edge of track 48 fall onto surface 46 and are gradually returned outwardly and, at input location 47, start up the track portion 48 for a second time.

After leaving the track section 48, the parts enter the next section 50 which is defined between wall 49 and a vane or guard rail 51, which vane increases gradually in height as indicated in FIGURE 4. This section of the track between the wall and vane 51 serves two principal functions. Any bunch or mass of parts which have managed to remain together while being fed over section 48 of the track encounters the leading edge of the vane, and some of these parts are dumped downwardly onto the bottom surface 46 for subsequent re-entry into the feeding track. The remaining parts which continue to walk up the track are thereafter aligned in a fore-and-aft direction, with either the head portion (body of the capacitor) or the tail portion (capacitor leads) leading. Many parts reach the entrance to section 50 with the main body 43 of the capacitor on the track and the legs extending outwardly over the track. As the legs encounter the gradually increasing height of vane 51, the legs are deflected rearwardly so that the capacitor is forced into the desired alignment. It is thus manifest that this portion of the feeding system performs a preliminary alignment of the parts. Although the parts are dumped into the feeder bowl in random fashion and with a multitude of different alignments, after the parts pass vane 51 there are only two different alignments remaining, either the head or the tail of the part leading.

After going through the preliminary alignment, the parts are fed along track section 52 upwardly, and are retained against outward displacement by the upper wall 53. The parts reach a narrowed portion of the track 54, which narrowing is effected by positioning a spacer or deflector 55 against the upper wall 53 and on track 52. Any bunching or massing of the parts is further obviated by the provision of this additional constricted portion of the feeding track. The parts are then fed over the penultimate track section which includes an upwardly inclined ramp portion 56, and the track terminates thereafter in a downwardly sloping incline 57 adjacent the indexing wheel mechanism 24. The mechanism for effecting the vibration of the bowl itself to effect the requisite upward and outward feeding is not described or illustrated, inasmuch as such mechanisms, together with the bowl arrangement are well known in the art. The feeding structure is especially suitable for this type of part feeding because of the addition of the vane portion 51 and the deflector 55, together with the ramp 56 and incline 57 at the termination of the feeding channel.

*Final alignment of parts*

FIGURE 6 indicates various major portions of the indexing wheel arrangement including a dial cover member 60 which comprises a vertical collar portion 61 and a horizontal outwardly flaring rim portion 62, with the rim portion defining a plurality of similar apertures 63 therein to admit light for a scanning process to be described hereinafter. Below rim portion 62 is a dial member 64, which is apertured as indicated to provide a plurality of apertures 65 of a vertical dimension approximately one and one-half times the thickness of a capacitor body. Such size arrangement precludes the entrance of more than a single capacitor body into any of the slots 65 in the dial. Beneath dial 64 a plurality of horizontally disposed tongues or cam portions 72 are visible, with the outer portions of these tongues supporting a like plurality of detents or vertical pins 67. As will become clear hereinafter, the vertical disposition of the cams are controlled by a stationary cam track as the dial 64 is displaced about its axis, thereby to selectively raise the pins 67 and effectively lock each capacitor in place, and thereafter lower the pins at the proper time to permit the ejection mechanism to unload the capacitors at the proper point.

The cooperation of the ramp 56 and incline 57 is best illustrated in FIGURE 6. Inasmuch as most of the capacitor weight is concentrated in the body portion, or the head, as this head passes over the ridge between ramp 56 and incline 57, the head immediately aligns itself with incline 57 to pass downwardly and into one of the slots 65 in the dial. Conversely, should a capacitor be aligned fore-and-aft but with the legs leading, or in a tail first presentation, while the capacitor body is still on ramp 56, the legs extend upwardly over incline 57 and over the adjacent periphery of rim portion 62. With this undesired alignment, the capacitor is thus knocked off the input area and does not enter into one of the slots 65. Accordingly, once the capacitor is indexed as shown by the capacitor with the leads extending out over incline 57, the proper final alignment of the part has been effected, notwithstanding that the capacitor must be rotated by the index wheel arrangement and subsequently ejected. Although the ultimate physical position has not been reached, the proper and desired alignment has been obtained.

Movement of the indexing wheel arrangement to carry the capacitors from the input portion 25 around to the lead-straightening station 26 will now be described, with reference particularly to FIGURES 7, 8 and 9. In FIGURE 8 a pair of photocells 69 and 70 are illustrated, one above and one below the location at which a capacitor is fed into the indexing table. Such photocells are operative to send and receive a beam of energy within the visible portion of the spectrum through aperture 63 and the brim portion 62 of the dial cover, notch 65 in the dial 64 and an aperture 68 defined in the periphery of the dial beneath the notch, and a wide aperture 71 in cam 72 which will be described hereinafter. Those skilled in the art will recognize that other forms of sensing arrangements can be utilized. For example, one of the elements 69 and 70 can be replaced by a reflective surface, with the other element sensing the level of ambient light which will be significantly reduced when the head of a capacitor enters slot 65.

Responsive to the entrance of a capacitor head into notch 65, an impulse is translated from photocells 69 and 70 to an amplifier unit 73 as indicated in FIGURE 9. The amplified impulse is in turn passed to a stepper motor 74, which in the present embodiment is of the type to effect the angular displacement of shaft 75 through one complete rotation or 360° movement. As will be explained subsequently, such rotation is effective to index the dial through one incremental movement in preparation for receiving the next part from the input area. A timer unit 76 is also shown intercoupled between the photocells and amplifier 73. The timer may be any of a multitude of well-known types which are operative after a given time period, which is adjustable, to transmit an impulse to amplifier 73 (and cause the dial to index) in the event that no impulse has been received from photocells 69 and 70 during that time, indicating that perhaps the leads of a part had entered the slot instead of the desired head-first presentation. Each time an impulse is received from the photocells (signifying proper orientation of the part) the timer is reset to zero, the dial is indexed, and the circuit again starts to count from that instant.

As shown in FIGURE 7, each complete angular displacement of shaft 75 is transmitted to a Geneva index or driver wheel 77, to which the shaft is fastened by a screw 78. This motion is in turn translated to the star wheel 79 of the Geneva movement, affixed by another such screw 80 to the main shaft 81 of the indexing wheel. Shaft 81 is fastened to a drive plate 82, and through suitable apertures in this plate, fastening means such as screw 83 pass and are received in correspondingly tapped sections of the inner portion 84 of dial cover 60 and the dial body 64. In the illustration of FIGURE 7 it appears that portion 84 of the dial plate cover is a separate part with respect to brim portion 62, but it is emphasized that both these parts are a single sheet of material which is apertured to define a plurality of slot-like openings 85 to accommodate movement of a ram unit during the ejection cycle.

Thus at this point a single capacitor has been aligned and fed into one of the slots in the dial, and through an impulse translated over the system depicted in FIGURE 9, the star wheel of the Geneva movement arrangement has rotated the entire index wheel 24 through an angular displacement represented by the center-to-center distance between two of the adjacent apertures 63 in the brim of the fence element, with such distance measured along an arc having a center coincident with the center of the indexing wheel structure.

If desired, a combing unit can be affixed adjacent the index wheel approximately at the position of numeral 64 in FIGURE 6. Such a comb structure can be disposed vertically somewhat like a ferris wheel, with a plurality of tines or spokes rotating just adjacent the periphery of brim 62 in order to comb out any tangled parts at a point in the operation of the index wheel after the raising of detent 67 and locking the capacitors securely in place before the lead-straightening operation.

Straightening of leads

In FIGURE 7 a bearing unit 86 is shown interposed between main drive shaft 81 and a stationary support unit 87, affixed on base plate 20. Outwardly of support 87 is shown a stationary cam structure 88, also disposed on and affixed to base plate 20. On the top of cam 88 a cam track 89 is formed, and the height of the cam track relative to base plate 20 is varied around the index wheel. At the right hand side of FIGURE 7, one of the cams 72 with its large aperture 71 is shown, and the detent 67 affixed to the outer periphery of this cam is shown in its lowermost position, the position assumed both when capacitor bodies are fed into each notch in the dial and when the capacitors are ejected to fall through the discharge chute 90, shown affixed by welding or other means to a support bracket 91 secured by a screw 92 in base plate 20. In this position, the tail portion 93 of cam 72 is forced upwardly by cam track 89, overcoming the bias force of spring 94 as the cam pivots in a counterclockwise direction about shaft 95, which passes both through the cam and the support bracket 96 fastened to the underside of dial 64. However, as the index wheel rotates approximately from the input position past the location of a combing station, if such is utilized, the vertical height of the cam track is lessened to approximately that indicated at the left hand portion of FIGURE 7, so that the force of the bias spring 94 in this station presses downwardly on the tail portion 93 of this cam, causing it to rotate in a clockwise direction and displace detent 67 upwardly to effectively retain a capacitor head within notch 65 at this station.

FIGURES 10 and 11 indicate the lead straightening mechanism 26 which imparts the desired configuration to each article in the system. Shown in FIGURE 10 are parts which have generally been described previously in connection with FIGURE 1. Also visible in FIGURE 10 is another support bracket 97 for the double-acting air cylinder 34. In addition, the base portion of guide member 32 is visible in FIGURE 10, and FIGURE 11 illustrates the upper portion of this guide member which is bifurcated to provide two arms or guide elements 98 and 99. These arms are indexed in corresponding grooves provided in the side of slide member 31, to effect the desired regulation of movement of member 31 in the horizontal plane responsive to actuation of cylinder 34.

The manner in which the guide rails fit into the side of slide 31 is depicted in FIGURE 12.

When a capacitor approaches the proper location to effect the lead straightening, such as the location in which capacitor 100 is indicated in FIGURES 10 and 11, inasmuch as experience has proved that the leads can be considered to be straight at least for the first ⅛ inch, the jaws 27 and 28 are left positioned as indicated in FIGURES 10 and 11. As shown in FIGURE 13, the jaws are opened with the teeth or large serrations thereon being tapered gradually so that upon being displaced toward each other, the jaws will gently guide the two separate conductors into their desired alignment. To effect lead straightening, air is removed from cylinder 29, over line 30, causing the jaws 27 and 28 to pivot about the respective shafts anchored in slide 31 and thus displacing the jaws toward each other until they attain the position indicated in FIGURE 14, in which the two leads of capacitor 100 are secured in the desired position. Air under pressure is then passed through hose 35, to effect the movement of cylinder rod 37 to the right as viewed in FIGURE 10, causing a corresponding displacement of slide 31 within arms 98 and 99 to the right. Jaws 27 and 28 are thus pulled to the right and, inasmuch as the jaws are locked as depicted in FIGURE 14, the leads of capacitor 100 are thereby straightened. The leads are thus provided with the straightened configuration of that indicated by the capacitor shown just past the lead-straightening station in FIGURE 11. After the straightening, air under pressure is passed through line 30 and the jaws again open to the position shown in FIGURE 10.

As the capacitor, now with the proper alignment and of the proper configuration, is passed on to the next station, air under pressure is applied through line 36 to air cylinder 34, effecting the movement of cylinder rod 37 and slide 31 to the left as shown in FIGURE 10, and returning jaws 27 and 28 in their open position to await the next straightening operation.

*Ejection of parts*

After the leads of the leads of the capacitor has been straightened, it is sequentially displaced along the material handling system until it arrives at the ejection mechanism 38, there to be displaced from its respective slot 65. In the left hand portion of FIGURE 7, notch 65 is shown with the inner portion terminated against the extremity of the transverse portion 101 of an ejection slide, which slide also comprises an upstanding portion 102. A bias spring 103 is interposed between post 102 and the inner portion of fence member 61 of the dial cover assembly. Each individual station has its own ejection slide and bias spring. Normally the bias spring 103 maintains the slide in the position indicated at the left hand portion of FIGURE 7, so that the inner faces of vertical posts 102 of these lines form a roughly circular outline around the interior of the indexing wheel, as better seen in FIGURE 6.

In the right hand portion of FIGURE 7, the ejector mechanism 38 is illustrated. As there shown, an intermediate support bracket 104 is disposed between the horizontal line 40 and another bracket 105 in which air cylinder 41 is supported in conventional manner. An actuator disc 106 is fastened on to the end of cylinder rod 107 for movement responsive to the application of air under pressure in line 108. The lower portion of actuator 106 extends downwardly to contact the rear face of the post portion 102 of the ejection slide positioned at the ejection station. As air under pressure is applied through hose 108 to cylinder 41, the cylinder rod 107 is displaced to the right until it reaches the position indicated, causing a like displacement of the ejection slide and compressing the bias spring 103. Thus, the extremity of the horizontal arm 101 of the ejection slide effectively fills notch 65, displacing outwardly therefrom the part which has been indexed and the lead straightened. The sides of discharge chute 90 are provided with a suitable lateral dimension to preclude any twisting or undesired displacement of the capacitor, so that it slides downwardly with a desired orientation for magazine loading or receipt by a subsequent automatic handling machine. It is noted that the cam member 72 has been operated, by reason of the engagement of this can with cam track 89, to its maximum downward position so that detent 67 is displaced downwardly and permits the part to discharge into chute 90.

Thus in broad outline it will be seen that the handling system provides for expeditious alignment of a multiplicity of parts disposed in random alignment. This is achieved by first performing an initial or preliminary alignment in which all the random alignments are reduced to only two, either head trailing or tail trailing. Second, a final alignment is imposed where the part is indexed in the rotating dial. Thereafter a uniform configuration is imparted to each article at the station including a lead-straightening structure, and the parts are then forwarded to the final station for oriented ejection. An artisan in this field will recognize that various other components may be utilized to perform the different functions, especially when different type articles are fed through a system.

Although a particular embodiment of the invention has been shown and described in full here, there is no intention to thereby limit the invention to the details of such embodiment. On the contrary the intention is to cover all modifications, alternative embodiments, usages and the equivalents of the material handling system as fall within the spirit and scope of the invention, specification, and appended claims.

We claim as our invention:

1. A material handling system for receiving parts each of which has a head portion and a tail portion, the tail portions being generally distorted from a desired configuration, a first alignment means for orienting said parts in a given direction with either said head portion or said tail portion leading, a second dial alignment means for cooperating with said first alignment means to provide a uniform orientation and radial indexing of each part, shaping means tangentially adjacent the dial alignment means for imparting a preassigned configuration to each part, and means for removing each part from the system in an oriented manner.

2. In a material handling system for receiving parts in random alignments, each part having a head portion and a tail portion, a first feeding means including a ramp up which the parts are fed in either a head-first or a tail-first position and an incline at the end of the ramp, a second feeding means including a movable member defining a plurality of spaced apart compartments, each compartment being dimensioned to receive an individual part, means for displacing said movable member past said incline to sequentially index indvidual parts in the respective compartments only when the parts are fed thereto in a head-first manner, means adjacent said movable member for standardizing the tail portion of each part, and means for removing each part from its respective compartment in an oriented manner.

3. In a material handling system into which parts are fed for alignment and straightening, each part having a head portion and a tail portion substantially lighter than the head portion, means for aligning the parts including an index member in which the head portion of each part is received at an input location, means for sensing entry of a head portion into said index member at said input location and for producing a control signal to indicate such entry, and means for displacing said index member through a preassigned distance in preparation for receiving the next part responsive to receipt of said control signal.

4. In a material handling system for receiving parts each of which includes a head portion and a tail portion substantially lighter than said head portion, a vibratory feeder for moving the parts up an inclined track, vane means adjacent a portion of the track for breaking up masses of parts, an incline at the end of said track onto which the heavier head portion of each part, aligned in a head-first manner, drops for proper feeding, an index wheel defining a plurality of slots for passage adjacent said incline to receive and index only those parts aligned in a head-first manner, means for displacing the index wheel to effect movement of the indexed parts along a work path, shaping means disposed adjacent the path for engaging and straightening the tail portions of each indexed path, and ejection means for removing the straightened parts in an oriented fashion.

5. In a material handling system in which a vibratory feeder receives parts, each part having a head portion substantially heavier than its tail portion, and the feeder deploys the parts in a fore-and-aft alignment with either the head or tail portion of each part leading, means in said feeder including an incline to present only those parts oriented in a head-first presentation for proper feeding at a preassigned input location, an index wheel defining a plurality of slots about its periphery for receiving the head portions of the parts and having movable retaining means positioned adjacent each slot, means for displacing said wheel to move said slots sequentially past said input location and thus index the head portions of successive parts in the slots, stationary cam means positioned adjacent said wheel to engage said retaining means and displace the same to positively retain the indexed parts in the wheel as the wheel is displaced along a predetermined path, straightening means positioned adjacent the path for engaging and straightening the tail portion of each part as such part is held securely by the retaining means, and ejection means positioned adjacent the path for operation after the retaining means has been moved out of its locking position to remove the parts from the index wheel in an oriented fashion.

6. In a material handling system for receiving lightweight parts, each part having a head portion and a tail portion substantially lighter than said head portion, a vibratory feeder for receiving the parts in random orientations and for feeding the parts up a spiral track, vane means disposed adjacent a first portion of said track and constricting means disposed on a second portion of said track to provide a fore-and-aft alignment of each part in either a head-first or tail-first orientation, an incline at the termination of said track onto which the heavier head portion of each head-first oriented part readily drops, an index wheel including a plurality of work stations spaced apart at uniform intervals along its periphery, each work station including a compartment for receiving the head portion of a head-first oriented part, movable retaining means operable in a first position to positively retain a part in the compartment and movable to a second position which affords movement of the head portion of a part into and out of its associated compartment, and ejection slide means operable to displace a part from its associated compartment, a tail-standardizing means positioned adjacent said index wheel and selectively operable to impart a uniform configuration to the tail portion of each part, an ejection actuator positioned adjacent said index wheel for selective operation to displace the ejection slide of a work station in an oriented manner, a cam track disposed adjacent the index wheel to engage the cam means of each station to maintain same in the second position as a part is indexed and ejected and in the first position as the tail portion of such part is standardized, and means for incrementally displacing said index wheel to move each work station sequentially past said incline, said tail-standardizing means, and said ejection actuator.

7. The method of aligning and shaping parts, each of which includes a head portion and a tail portion, which comprises the steps of feeding the parts in random fashion into a hopper, vibrating the parts onto a track to effect fore-and-aft alignment of each part with either the head or tail portion leading, passing each part over an incline whereby the parts aligned head-first are passed into a work pocket with the tail portion extending from the pocket, conforming the extending tail portion of each part to a desired configuration, and sequentially removing the conformed parts from the pockets in an oriented fashion.

8. The method of aligning and shaping small, lightweight parts having a head portion and a pair of leads extending from the head to comprise a tail portion which includes the steps of passing the parts along a feeding track, narrowing the track to align each part with either the head or the tail portion leading, tilting the track to cause the head-first parts to be properly presented for indexing in a receiving slot, displacing the indexed parts along a work path, engaging and straightening the leads extending from the slot, and removing the parts from the slots in an oriented manner.

References Cited by the Examiner

UNITED STATES PATENTS

| | | | |
|---|---|---|---|
| 2,935,097 | 5/1960 | Wohlman | 140—147 |
| 2,993,516 | 7/1961 | Davison et al. | 140—147 |
| 3,013,590 | 12/1961 | Pechy | 140—147 |
| 3,034,633 | 5/1962 | Clifford et al. | 198—33.1 |
| 3,075,562 | 1/1963 | Jankowski | 140—147 |
| 3,084,780 | 4/1963 | Whitney | 198—33.1 |
| 3,122,179 | 2/1964 | Zimmerman et al. | 140—147 |

CHARLES W. LANHAM, *Primary Examiner.*

WILLIAM J. STEPHENSON, *Examiner.*